(12) United States Patent
Kameda

(10) Patent No.: US 7,522,486 B2
(45) Date of Patent: Apr. 21, 2009

(54) OPTICAL DISC APPARATUS

(75) Inventor: Hiroyuki Kameda, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 610 days.

(21) Appl. No.: 11/354,823

(22) Filed: Feb. 16, 2006

(65) Prior Publication Data
US 2006/0187777 A1 Aug. 24, 2006

(30) Foreign Application Priority Data
Feb. 24, 2005 (JP) .............................. 2005-048290

(51) Int. Cl.
*G11B 7/00* (2006.01)
(52) U.S. Cl. .................. 369/44.32; 369/53.28
(58) Field of Classification Search ................. None
See application file for complete search history.

(56) References Cited
U.S. PATENT DOCUMENTS 5,886,496 A * 3/1999 Furukawa et al. ........ 369/53.19

2004/0042356 A1 3/2004 Kato et al.
2004/0257930 A1 * 12/2004 Ohno ...................... 369/44.32
2005/0007904 A1 * 1/2005 Ishiyama et al. .......... 369/44.32

FOREIGN PATENT DOCUMENTS

| JP | 2000-311369 A | 11/2000 |
|----|---------------|---------|
| JP | 2002-342963 A | 11/2002 |
| JP | 2004-95035 A  | 3/2004  |

* cited by examiner

*Primary Examiner*—Paul Huber
(74) *Attorney, Agent, or Firm*—Crowell & Moring LLP

(57) ABSTRACT

An optical disc apparatus varies a tilt angle of an optical pickup from inward to outward of an optical disc, and stores a then obtained TE (Tracking Error) signal in a memory of a control circuit. The control circuit extracts amplitude values of the TE signal at tilt angles at predetermined angular intervals from the TE signal stored in the memory, and temporarily stores the extracted amplitude values in the memory, and further uses the stored amplitude values to determine a cubic curve to approximate the extracted amplitude values based on the least squares method. After determining the cubic curve, the control circuit sets a tilt angle corresponding to a maximum point of the cubic curve as an optimum tilt angle. This makes it possible to obtain a proper optimum tilt angle even with a surface-vibrating optical disc which much vibrates in the thickness direction during rotation.

3 Claims, 5 Drawing Sheets

OPTICAL DISC APPARATUS

BACKGROUND OF THE INVENTION

1. Field of the Invention

The present invention relates to an optical disc apparatus, and more particularly to an optical disc apparatus with a tilt angle adjustment function for an optical pickup.

2. Description of the Related Art

In an optical disc, an optical pickup for irradiating a laser beam onto an optical disc rotating on a turntable so as to read a signal or signals recorded on the optical disc is always required to irradiate the laser beam perpendicularly to a surface of the optical disc for the purpose of maintaining high reading accuracy. An angle of an optical axis of the laser beam relative to the surface of the optical disc is referred to as a tilt angle. An optical disc apparatus with an exclusive tilt sensor detects the tilt angle by the tilt sensor so as to obtain a proper tilt angle.

However, the use of an exclusive tilt sensor causes drawbacks, for example, that a base for mounting an optical pickup is required to have space for mounting the tilt sensor, and that an exclusive circuit for the tilt sensor causes a cost increase. For this reason, an optical disc apparatus has been developed that does not use an exclusive tilt sensor, but can detect an optimum tilt angle based on a reproduction signal of a reflected laser beam which the optical pickup receives. For example, Japanese Laid-open Patent Publication 2002-342963 discloses an optical disc apparatus which measures amplitude values of a reproduction signal of a reflected laser beam at multiple varied angles at predetermined angular intervals of an optical pickup relative to an optical disc (tilt angles), and which approximates the relationship between the amplitude value and the tilt angle by a quadratic function using the least squares method, so as to find an optimum tilt angle.

Japanese Laid-open Patent Publication 2004-95035 discloses an optical disc apparatus to obtain a proper tilt angle even for an unrecorded optical disc, by using reflected laser beams from land prepits on the optical disc, and by detecting a tilt angle to give a maximum signal amplitude of reflected laser beam and considering an offset amount, so as to find an optimum tilt angle. Furthermore, Japanese Laid-open Patent Publication 2000-311369 discloses an optical disc apparatus which finds an optimum tilt angle, using a tracking error signal detected by an optical pickup. In both of the latter two optical disc apparatus, quadratic function approximation is used to find or calculate a maximum value in obtained signal amplitudes.

As described above, conventional optical disc apparatus for finding an optimum tilt angle based on a reproduction signal of a reflected laser beam use quadratic function approximation in order to find a maximum amplitude value of e.g. a reproduction signal. However, experiments performed by the present inventor have indicated that the optimum tilt angle (maximum point) found by the quadratic function approximation slightly (more or less) shifts or deviates from an optimum tilt angle found by actually reproducing an optical disc. The experiments have further indicated that if a so-called "surface-vibrating" optical disc which much vibrates in the thickness direction during rotation is used, the shift is likely to be large.

SUMMARY OF THE INVENTION

An object of the present invention is to provide such an optical disc apparatus with a tilt angle adjustment function that finds or calculates an optimum tilt angle based on amplitude values of a signal of a reflected laser beam, and that makes it possible to obtain a proper optimum tilt angle even with a surface-vibrating optical disc which much vibrates in the thickness direction during rotation so as to obtain clear reproduced images and sounds at any radial position on the optical disc.

The object of the present invention is achieved by an optical disc apparatus comprising: an optical pickup for irradiating a laser beam onto an optical disc, and receiving the laser beam reflected from the optical disc so as to read a signal recorded on the optical disc; a tilt angle varying unit for varying a tilt angle of the optical pickup relative to the optical disc either from inward to outward of the optical disc or from outward to inward of the optical disc; an amplitude storage unit for storing amplitude values of the signal of the reflected laser beam when the tilt angle varying unit varies the tilt angle of the optical pickup; and an optimum tilt angle calculation unit for calculating a tilt angle to give a maximum value of the amplitude of the signal of the reflected laser beam. Therein, the optimum tilt angle calculation unit calculates the tilt angle by approximating, with a cubic curve, amplitude values of the signal of the reflected laser beam corresponding to tilt angles of the optical pickup at predetermined angular intervals, the amplitude values being stored in the amplitude storage unit.

Preferably, the optimum tilt angle calculation unit sets, as the optimum tilt angle, a tilt angle corresponding to a maximum point of the cubic curve for the approximation.

Further preferably, the signal of the reflected laser beam is a TE (Tracking Error) signal or an RF (Radio Frequency) signal so that the amplitude storage unit stores the amplitude values of the TE signal or the RF signal, and the optimum tilt angle calculation unit comprises: (i) an amplitude value extraction unit for extracting the amplitude values of the TE signal or the RF signal corresponding to the tilt angles of the optical pickup at the predetermined angular intervals from the TE signal or the RF signal stored in the amplitude storage unit; (ii) a cubic curve determination unit for determining the cubic curve to approximate, based on the least squares method, the amplitude values of the TE signal or the RF signal extracted by the amplitude value extraction unit; and (iii) an optimum tilt angle setting unit for setting, as the optimum tilt angle, a tilt angle corresponding to a maximum point of the cubic curve determined by the cubic curve determination unit.

The optical disc apparatus according to the present invention makes it possible to obtain a proper optimum tilt angle even with a surface-vibrating optical disc which much vibrates in the thickness direction during rotation so as to obtain clear reproduced images and sounds at any radial position on the optical disc.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIGS. 4A and 4B are schematic views showing tilting operations of an optical pickup relative to the optical disc, in which FIG. 4A shows the case of an optical disc with a low degree of surface vibration, while FIG. 4B shows the case of an optical disc with a high degree of surface vibration;

DESCRIPTION OF THE PREFERRED EMBODIMENTS

The best mode and preferred embodiments of the present invention will be described hereinafter with reference to the annexed drawings. Note that the specific embodiments described are not intended to cover the entire scope of the present invention, and hence the present invention is not limited to only the specific embodiments.

Figure 4A:
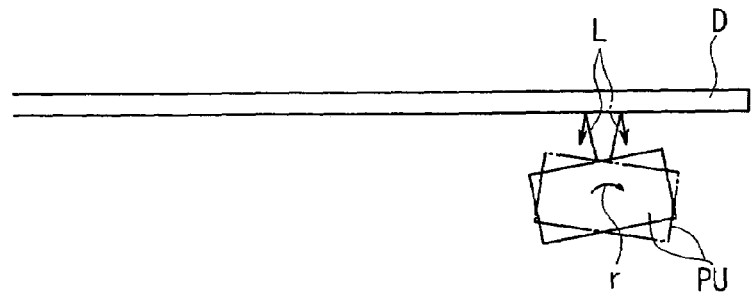
Figure 4B:
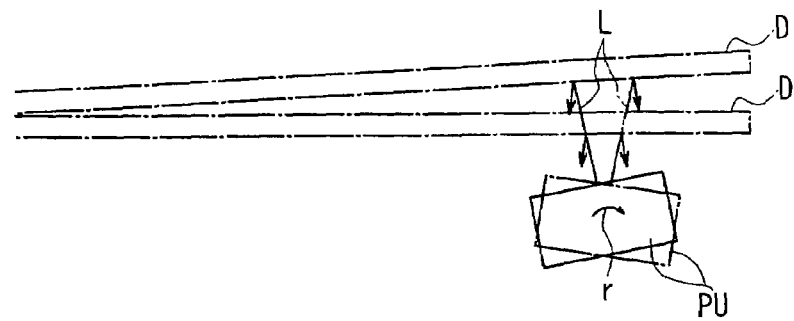

Before describing specific embodiments of the present invention, the following is a description of how the inventor has conceived the present invention with reference to FIGS. 4A, 4B, 5, 6 and 7. First, FIGS. 4A and 4B are schematic views showing tilting operations of an optical pickup PU relative to an optical disc D, in which FIG. 4A shows the case of an optical disc with a low degree of surface vibration, while FIG. 4B shows the case of an optical disc with a high degree of surface vibration. Referring to these FIGS. 4A and 4B, it will be described below how to find an optimum tilt angle at a radially outer position on the optical disc D. Note that the "tilt angle" is more exactly a "radial tilt angle", but the term "tilt angle" is used in the present specification for simplicity.

For finding an optimum tilt angle of the optical pickup PU, the tilt angle of the optical pickup PU is varied along the radial direction of the optical disc D from inward to outward (by swinging the optical pickup PU in direction "r"), while amplitudes of a signal of the reflected light signal received by the optical pickup PU are measured. A tilt angle which gives a maximum amplitude of the signal of the reflected light among them is the optimum tilt angle. In the case of the optical disc D with the low degree of surface vibration as shown in FIG. 4A, the light path of laser beam L emitted from the optical pickup PU and reflected by the optical disc D is stable in both a radially inward oriented state (as represented by a solid line) and a radially outward oriented state (as represented by a dot-dash line) of the optical pickup PU.

On the other hand, in the case of the optical disc D with the high degree of surface vibration as shown in FIG. 4B, the light path of laser beam L emitted from the optical pickup PU and reflected by the optical disc D is unstable and fluctuates in both a radially inward oriented state (as represented by a solid line) and a radially outward oriented state (as represented by a dot-dash line) of the optical pickup PU. Particularly in the outer oriented state of the optical pickup PU, it is significantly influenced by the surface vibration of the optical disc D, thereby causing a light path length of the laser beam L to significantly fluctuate.

Figure 5:
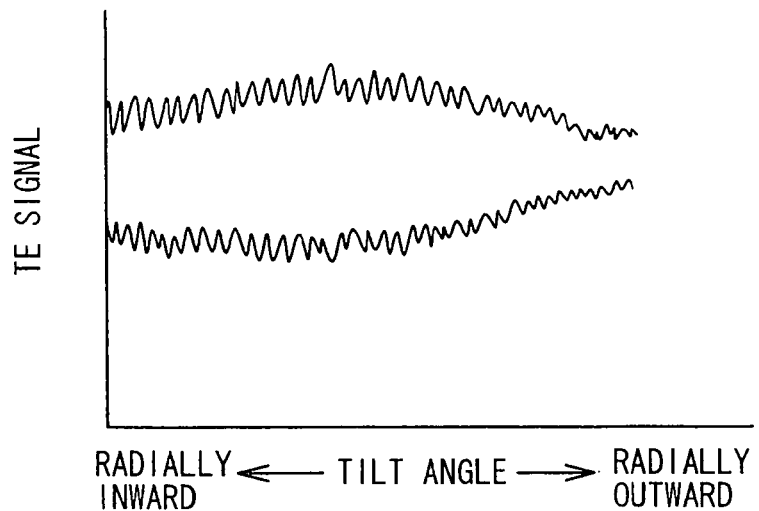
FIG. 5 is a graph showing a TE signal measured in the tilting operation of the optical pickup using the optical disc with the low degree of surface vibration.
Figure 6:
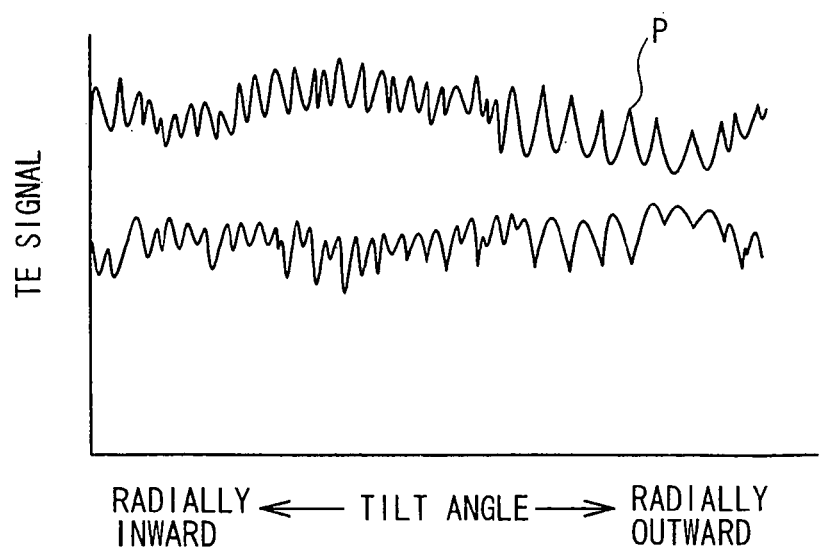
FIG. 6 is a graph showing a TE signal measured in the tilting operation of the optical pickup using the optical disc with the high degree of surface vibration.

FIGS. 5 and 6 are graphs showing signal amplitudes of actually detected or measured tracking error signals (hereafter referred as to "TE signals") in the tilting operations of the optical pickup PU, where the horizontal axis represents tilt angle while the vertical axis represents signal amplitude. FIG. 5 shows a TE signal measured using the optical disc D with the low degree of surface vibration, while FIG. 6 shows a TE signal measured using the optical disc D with the high degree of surface vibration. In each of FIGS. 5 and 6, the two waveforms shown are envelopes of each TE signal.

As apparent from these Figures, the TE signal of FIG. 5 has small amplitude fluctuations and has a relatively regular wave pattern overall. In contrast, the TE signal of FIG. 6 has large amplitude fluctuations overall, such that particularly when the tilt angle is oriented radially outward, surge-like peaks P appear at substantially constant angular intervals. It is considered that the significant fluctuations, which occur with the tilt angle being swung radially outward in the case of the optical disc D with the high degree of surface vibration, are caused by the significant fluctuations of the light path length of the laser beam L which cannot be sufficiently followed by focus servo control of the optical pickup PU.

In any event, the surface vibration of the optical disc D is hard to avoid because it is caused by shift in the center of gravity or deformation of the optical disc D itself. Accordingly, it is required that an optimum tilt angle to give a maximum TE signal can be found even in the case of detecting a TE signal with significant amplitude fluctuations as shown in FIG. 6.

The present inventor has conducted further studies, and has found that, when detecting a TE signal as shown in FIG. 6, quadratic function approximation used to approximate the TE signal using a quadratic curve causes a slight difference or error. For actually approximating the TE signal by a quadratic curve, amplitude values of the TE signal at tilt angles at predetermined angular intervals for ten and a few positions are extracted as shown in later described FIG. 7. The extracted amplitude values are subjected to the least squares method so as to determine a quadratic curve for approximation. However, if such process is applied to the TE signal as shown in FIG. 6 to extract amplitude values at varied tilt angles at predetermined angular intervals, and if the extraction positions are near peaks of amplitudes, then relatively large amplitude values are extracted. This tendency becomes more pronounced in an area of tilt angles oriented radially outward where surge-like peaks P repeatedly appear. This will be described in more detail below with reference to FIG. 7.

Figure 7:
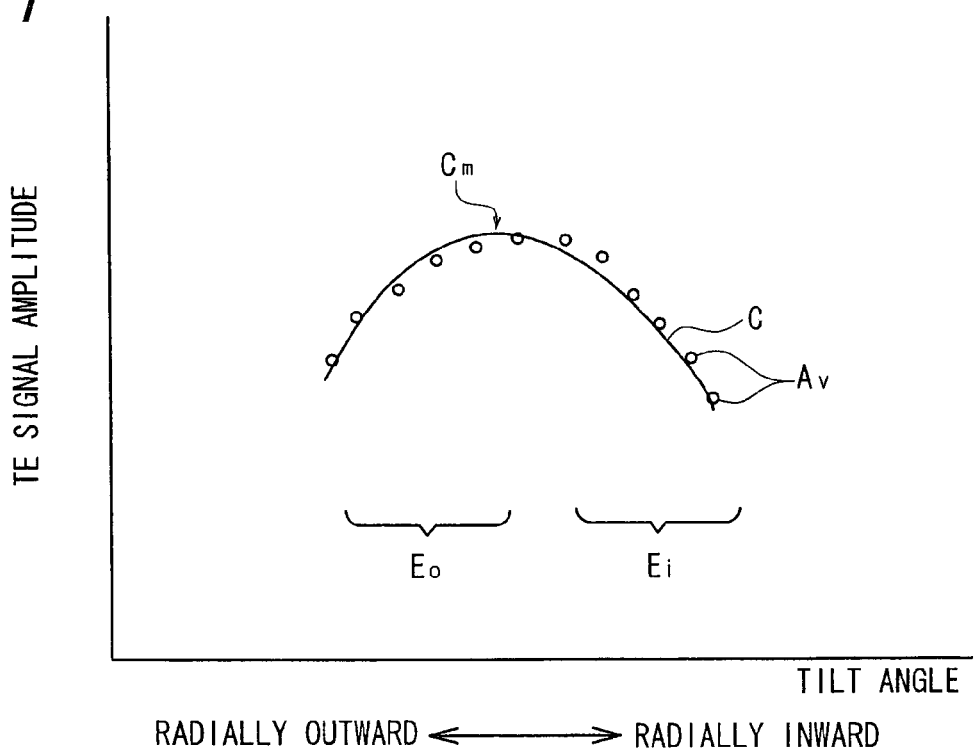
FIG. 7 is a graph showing a relationship between TE signal amplitudes, which are extracted to find an optimum tilt angle in a conventional optical disc apparatus, and a quadratic curve approximating the TE signal amplitudes.

FIG. 7 is a graph showing a relationship between TE signal amplitudes, which are extracted so as to find an optimum tilt angle in a conventional optical disc apparatus, and a quadratic curve approximating the TE signal amplitudes. FIG. 7 shows twelve TE signal amplitude values Av extracted from the TE signal at tilt angles at predetermined angular intervals when the tilt angle of the optical pickup PU is varied along the radial direction of the optical disc D from inward to outward (i.e. by swinging the optical pickup PU in direction "r") as shown in FIG. 4A or FIG. 4B. As apparent from FIG. 7, the amplitude values Av in an area Eo of outward oriented tilt angles are larger on average than the amplitude values Av in an area Ei of inward oriented tilt angles. Accordingly, a quadratic curve C made by the least squares method to approximate these twelve amplitude values Av has a maximum point Cm at a position shifted or deviated to the area Eo from an interface between the areas Eo and Ei. Thus, if the tilt angle at the maximum point Cm is set as an optimum tilt angle, such optimum tilt angle is slightly more outward oriented than a proper optimum tilt angle.

As long as the extracted amplitude values Av are approximated by a quadratic curve, it is not possible to avoid the influence of the shift of the amplitude values Av extracted in the Eo of outward oriented tilt angles (namely shift to a larger amplitude value). Thus, the optimum tilt angle obtained in this manner always shifts to the area Eo from an intrinsic or true optimum tilt angle. Accordingly, if the tilt angle is set based on the optimum tilt angle obtained by such conventional optical disc apparatus, there is a possibility that reproduced images and sounds lack clarity, particularly in the case of optical disc D with a high degree of surface vibration.

The present inventor has conducted further studies, and has found that approximation of the extracted amplitude values with a cubic curve (namely cubic function approximation) provides a method of avoiding the influence of the shift of the amplitude values Av extracted in the Eo of outward oriented tilt angles (namely shift to a larger amplitude value) so as to obtain a proper or intrinsic optimum tilt angle. Based on this finding, the inventor has completed the present invention.

Figure 1:
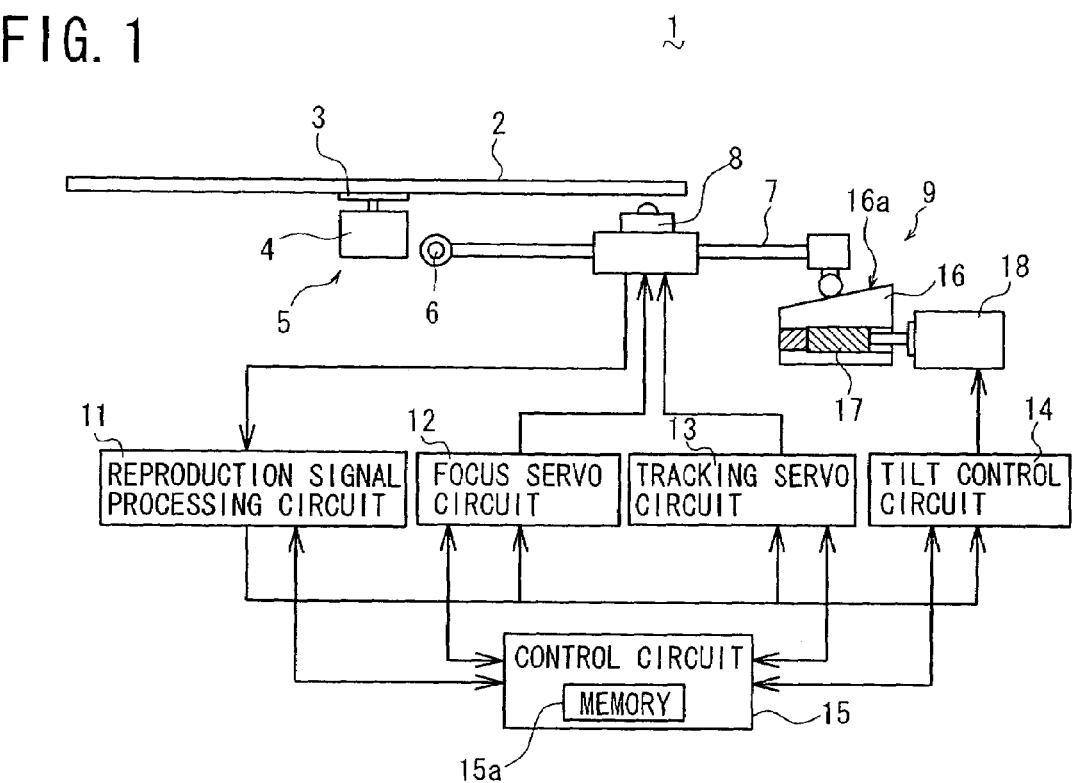
FIG. 1 is a schematic block diagram of an optical disc apparatus according to an embodiment of the present invention.
Figure 2:
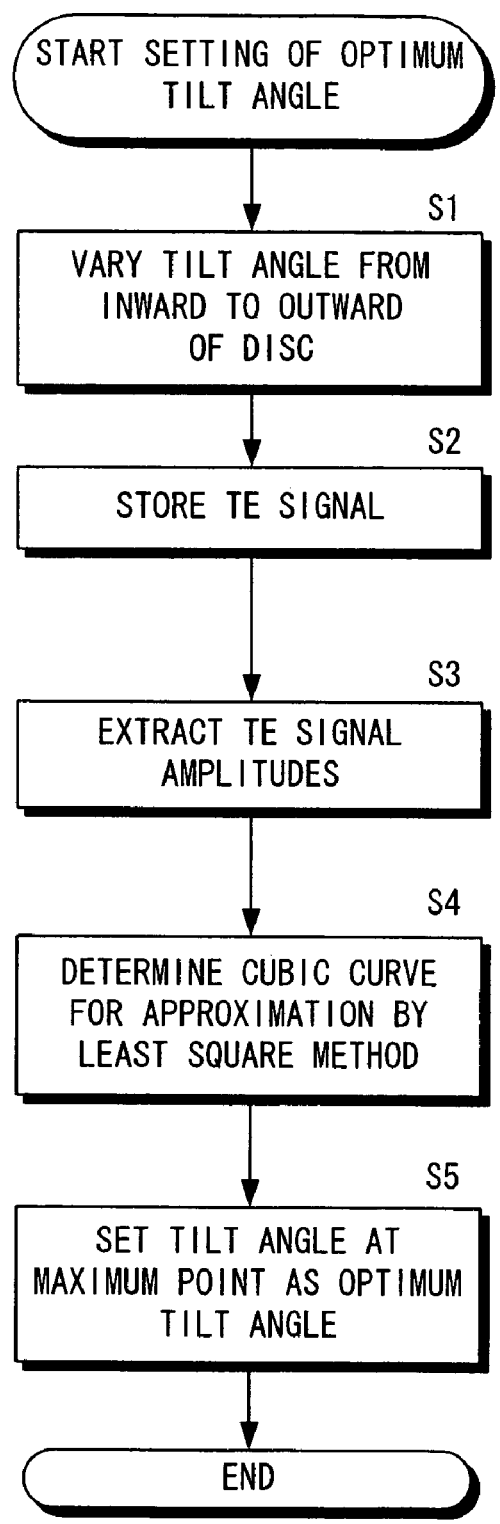
FIG. 2 is a flow chart showing a process for setting of an optimum tilt angle performed by the optical disc apparatus at an outermost position of an optical disc.
Figure 3:
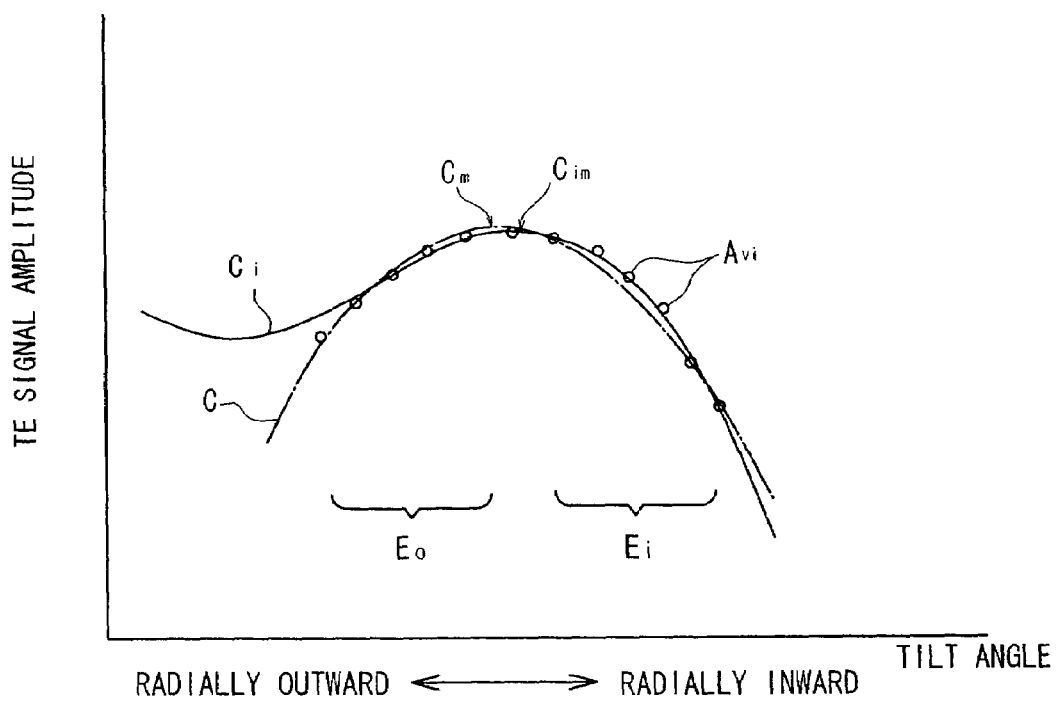
FIG. 3 is a graph showing extracted amplitude values of an TE signal and a cubic curve for approximation as well as a quadratic curve for approximation.

Referring now to FIG. 1 to FIG. 3, an optical disc apparatus 1 according to an embodiment of the present invention will be described hereinafter. Referring to FIG. 1, which shows a schematic block diagram of the optical disc apparatus 1, the optical disc apparatus 1 comprises: an optical disc rotation drive 5 having a turntable 3 for placing an optical disc 2 and a spindle motor 4 for rotating the turntable 3 at a predetermined speed; an optical pickup 8 which is guided by a guide rail 7 pivotally supported by a support 6 at an end thereof and movable up and down at the other end thereof, and which is moved by a feed motor (not shown) to seek in a radial direction of the optical disc 2; and a tilt angle varying mechanism 9 (claimed "tilt angle varying unit") for varying the tilt angle of the optical pickup 8 either from inward to outward of the optical disc 2, or from outward to inward of the optical disc 2. The optical pickup 8 irradiates a laser beam to the optical disc 2, and receives the reflected laser beam from the optical disc 2, so as to read a signal of the reflected laser beam, which corresponds to a signal recorded on the optical disc 2.

The optical disc apparatus 1 further comprises: a reproduction signal processing circuit 11 for receiving the signal of the reflected laser beam received by the optical pickup 8 and converting the signal to e.g. an RF (Radio Frequency) signal and/or a TE (Tracking Error) signal; a focus servo circuit 12 for receiving a signal from the reproduction signal processing circuit 11 so as to control focus of the optical pickup 8; a tracking servo circuit 13 for also receiving a signal from the reproduction signal processing circuit 11 so as to control tracking of the optical pickup 8; and a control circuit 15 comprised of a microprocessor for overall control of the reproduction signal processing circuit 11, the focus servo circuit 12, the tracking servo circuit 13 and a later described tilt control circuit 14. The control circuit 15 has a memory 15a for storing various data.

The tilt angle varying mechanism 9 comprises: a cylindrical sloped cam mechanism 16 provided on the up and down movable end of the guide rail 7 of the optical pickup 8; a tilt motor 18 coupled via a gear 17 to the sloped cam mechanism 16 for moving a sloped cam surface 16a (moving in the left-right direction in FIG. 1); and a tilt control circuit 14 for outputting a predetermined rotation command to the tilt motor 18. When the tilt motor 18 rotates in response to the command from the tilt control circuit 14 so as to move the sloped cam surface 16a, the up and down movable end of the guide rail 7, which is in rotational contact with the sloped cam surface 16a, moves up and down so as to vary the tilt angle of the optical pickup 8.

More specifically, when the sloped cam surface 16a is moved to the left in FIG. 1, the up and down movable end of the guide rail 7 is moved upward so as to slightly pivot or swing the optical pickup 8 counterclockwise in FIG. 1 (namely cause the optical pickup 8 to tilt radially inward of the optical disc 2). In contrast, when the sloped cam surface 16a is moved to the right in FIG. 1, the up and down movable end of the guide rail 7 is moved downward so as to slightly pivot or swing the optical pickup 8 clockwise in FIG. 1 (namely cause the optical pickup 8 to tilt radially outward of the optical disc 2).

Note here that an optimum tilt angle of the optical pickup 8 is set for many different radial positions on the optical disc 2 from the innermost position to the outermost position. More specifically, for setting optimum tilt angles of the optical pickup 8 for such radial positions, the optical pickup 8 is moved to seek to each of the innermost position and the outermost position (more specifically such positions in a data recorded area) of the optical disc 2. At each of the innermost and outermost positions, the optimum tilt angle of the optical pickup 8 is set. (A manner of setting the optimum tilt angle will be described later, using the setting at the outermost position as an example.) The optimum tilt angles set at the innermost and outermost positions are used to set optimum tilt angles for intermediate positions between them in a manner that the difference between the optimum tilt angles set at the innermost and outermost positions is proportionally distributed for each of the intermediate positions. The control circuit 15 performs the setting of the optimum tilt angle for each of the intermediate positions, using a program stored in the control circuit 15.

Referring now to the flow chart of FIG. 2 along with the block diagram of FIG. 1, the following describes a process for the setting of the optimum tilt angle performed by the optical disc apparatus 1 at the outermost position of the optical disc 2, namely performed in the state where the optical pickup 8 is moved to seek to the outermost position of the optical disc 2. First, the control circuit 15 outputs, to the tilt control circuit 14, a rotation command to rotate the tilt motor 18 at a predetermined rotational speed. In response to the rotation command, the tilt control circuit 14 applies a predetermined voltage to the tilt motor 18 so as to move the sloped cam surface 16a to the right in FIG. 1. Thereby, the optical pickup 8 is pivoted clockwise in FIG. 1 so as to vary the tilt angle of the optical pickup 8 from inward to outward of the optical disc 2 (S1). The optical pickup 8 receives reflected laser beam from the optical disc 2, and outputs a signal of the reflected laser beam to the reproduction signal processing circuit 11 while the optical pickup 8 is pivoted. The reproduction signal processing circuit 11 converts the signal received from the optical pickup 8 to a TE (Tracking Error) signal. The control circuit 15 stores the thus obtained TE signal in the memory 15a therein (S2).

Next, the control circuit 15 (claimed "amplitude extraction unit") extracts amplitude values of the TE signal at predetermined intervals (at tilt angles at predetermined angular intervals) from the TE signal stored in the memory 15a (S3). In the present embodiment, the number of the extracted amplitude values (number of the tilt angles) is twelve. The control circuit 15 temporarily stores the extracted multiple amplitude values of the TE signal in the memory 15a (claimed "amplitude storage unit"). The control circuit 15 (claimed "cubic curve determination unit") uses the thus stored amplitude values of the TE signal to determine a cubic curve which approximates the extracted amplitude values based on the known least squares method (S4). After determining the cubic curve for the approximation, the control circuit 15 (claimed "optimum tilt angle setting unit") sets, as an optimum tilt angle, a tilt angle corresponding to a maximum point of the cubic curve (S5).

Thus, the control circuit 15 along with other necessary elements can be said to serve as claimed "optimum tilt angle calculation unit" which comprises the "amplitude extraction unit", the "cubic curve determination unit" and the "optimum tilt angle setting unit", collectively, and which calculates or finds a tilt angle to give a maximum amplitude of the reflected laser beam on the basis of the amplitude values corresponding to the multiple tilt angles stored therein (i.e. in the "amplitude storage unit"). More specifically, the "optimum tilt angle calculation unit" approximates, with the cubic curve, the amplitude values which are stored in the "amplitude storage unit", and which correspond to the tilt angles at the predetermined angular intervals, so as to calculate the optimum tilt angle.

FIG. 3 is a graph showing extracted amplitude values Avi of the TE signal and cubic curve Ci for approximation, represented by a solid line, approximating the extracted amplitude values Avi as well as quadratic curve C for approximation (for reference and comparison), represented by a dot-dash line, approximating extracted amplitude values Avi also based on the least squares method. As apparent from FIG. 3, among the twelve amplitude values Avi, those in an area Eo of outward oriented tilt angles are larger than those in an area Ei of inward oriented tilt angles for the reason as described above. However, by using the cubic curve Ci for the approximation, a maximum point Cim in the curve can be determined as a position of a proper optimum tilt angle. On the other hand, in the case of the quadratic curve C for comparison, its maximum point Cm is influenced by those in the area Eo of outward oriented tilt angles so as to be shifted or deviated to the area Eo (to the left in FIG. 3) from an interface between the areas Eo and Ei.

Referring back to the flow chart of FIG. 2, the above has described the process for the setting of the optimum tilt angle which the control circuit 15 performs at the outermost position of the optical disc 2, namely in the state where the optical pickup 8 is moved to seek to the outermost position of the optical disc 2. In a similar manner, the control circuit 15 sets the optimum tilt angle at the innermost position of the optical disc 2, namely in the state where the optical pickup 8 is moved to seek to the innermost position of the optical disc 2. Using a program stored in the control circuit 15, the control circuit 15 sets an optimum tilt angle at each of intermediate positions between the outermost position and the innermost position of the optical disc 2 on the basis of the proportional distribution of the optimum tilt angles at the outermost and innermost positions as described above.

In this way, the control circuit 15 sets optimum tilt angles at arbitrary or any radian positions from the outermost position to the innermost position of the optical disc 2, and stores these optimum tilt angles in the memory 15a. Thus, when the optical disc apparatus 1 starts reproduction of the optical disc 2 (e.g. DVD) thereafter, the tilt angle varying mechanism 9 operates to allow the tilt angle of the optical pickup 8 at an arbitrary or any radial position on the optical disc 2 to be an optimum tilt angle set and stored by the control circuit 15 even when the optical disc 2 much vibrates in the thickness direction during rotation, thereby making it possible to obtain clear reproduced images and sounds at any radial position on the optical disc 2.

It is to be noted that the present invention is not limited to the above embodiment, and various modifications are possible. For example, in the above embodiment, the optical pickup 8 is pivoted clockwise in FIG. 1 so as to vary the tilt angle of the optical pickup 8 from inward to outward of the optical disc 2 in the step S1. However, as apparent from the above description, the optical pickup 8 can be pivoted counterclockwise in FIG. 1 so as to vary the tilt angle of the optical pickup 8 from outward to inward of the optical disc 2. Furthermore, the control circuit 15 according to the above embodiment sets an optimum tilt angle by using a TE signal obtained from the reproduction signal processing circuit 11. However, the control circuit 15 can use an RF signal obtained from the reproduction signal processing circuit 11 in place of the TE signal obtained therefrom, so as to set an optimum tilt angle in a similar manner as in the case of the TE signal.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. An optical disc apparatus comprising:
   an optical pickup for irradiating a laser beam onto an optical disc, and receiving the laser beam reflected from the optical disc so as to read a signal recorded on the optical disc;
   a tilt angle varying unit for varying a tilt angle of the optical pickup relative to the optical disc either from inward to outward of the optical disc or from outward to inward of the optical disc;
   an amplitude storage unit for storing amplitude values of the signal of the reflected laser beam when the tilt angle varying unit varies the tilt angle of the optical pickup; and
   an optimum tilt angle calculation unit for calculating a tilt angle to give a maximum value of the amplitude of the signal of the reflected laser beam,
   wherein the optimum tilt angle calculation unit calculates the tilt angle by approximating, with a cubic curve, amplitude values of the signal of the reflected laser beam corresponding to tilt angles of the optical pickup at predetermined angular intervals, the amplitude values being stored in the amplitude storage unit.

2. The optical disc apparatus according to claim 1, wherein the optimum tilt angle calculation unit sets, as the optimum tilt angle, a tilt angle corresponding to a maximum point of the cubic curve for the approximation.

3. The optical disc apparatus according to claim 1, wherein the signal of the reflected laser beam is a TE (Tracking Error) signal or an RF (Radio Frequency) signal so that the amplitude storage unit stores the amplitude values of the TE signal or the RF signal, and the optimum tilt angle calculation unit comprises:
   (i) an amplitude value extraction unit for extracting the amplitude values of the TE signal or the RF signal corresponding to the tilt angles of the optical pickup at the predetermined angular intervals from the TE signal or the RF signal stored in the amplitude storage unit;
   (ii) a cubic curve determination unit for determining the cubic curve to approximate, based on the least squares method, the amplitude values of the TE signal or the RF signal extracted by the amplitude value extraction unit; and
   (iii) an optimum tilt angle setting unit for setting, as the optimum tilt angle, a tilt angle corresponding to a maximum point of the cubic curve determined by the cubic curve determination unit.

* * * * *